US012706258B2

(12) United States Patent
Tannhäuser et al.

(10) Patent No.: US 12,706,258 B2
(45) Date of Patent: Aug. 11, 2026

(54) CIRCUIT BREAKER

(71) Applicant: Siemens Aktiengesellschaft, Munich (DE)

(72) Inventors: Marvin Tannhäuser, Hausen (DE); Manfred Heindl, Alteglofsheim (DE); Jörg Hussmann, Neumarkt (DE)

(73) Assignee: Siemens Aktiengesellschaft, Munich (DE)

( * ) Notice: Subject to any disclaimer, the term of this patent is extended or adjusted under 35 U.S.C. 154(b) by 327 days.

(21) Appl. No.: 18/696,473

(22) PCT Filed: Sep. 16, 2022

(86) PCT No.: PCT/EP2022/075765
§ 371 (c)(1),
(2) Date: Mar. 28, 2024

(87) PCT Pub. No.: WO2023/052148
PCT Pub. Date: Apr. 6, 2023

(65) Prior Publication Data
US 2024/0395477 A1 Nov. 28, 2024

(30) Foreign Application Priority Data
Sep. 28, 2021 (DE) ..................... 10 2021 210 816.4

(51) Int. Cl.
*H02H 3/00* (2006.01)
*H01H 9/54* (2006.01)
(Continued)

(52) U.S. Cl.
CPC ............ *H01H 9/547* (2013.01); *H01H 9/548* (2013.01); *H01H 71/04* (2013.01); *H01H 71/125* (2013.01); *H01H 83/226* (2013.01)

(58) Field of Classification Search
CPC ...................................................... H01H 9/547
See application file for complete search history.

(56) References Cited

U.S. PATENT DOCUMENTS

2017/0004948 A1* 1/2017 Leyh ...................... H01H 9/547
2020/0366078 A1 11/2020 Telefus et al.
(Continued)

FOREIGN PATENT DOCUMENTS

DE 102019213604 A1 3/2021
EP 2234136 A1 9/2010

*Primary Examiner* — Stephen W Jackson
(74) *Attorney, Agent, or Firm* — Laurence A. Greenberg; Werner H. Stemer; Ralph E. Locher

(57) ABSTRACT

A circuit breaker protects an electric low-voltage circuit. The circuit breaker has a housing with grid-side connections and load-side connections for conductors of the low-voltage circuit and a series circuit containing a mechanical separating contact unit and an electronic interruption unit. The separating contact unit is paired with the grid-side connections, and the interruption unit is paired with the load-side connections. The mechanical separating contact unit has a handle for closing and opening contacts. A current sensor is arranged in a conductor path between the separating contact unit and the interruption unit, for ascertaining the level of the current of the low-voltage circuit. The circuit breaker is configured such that when current thresholds and/or current/time thresholds are exceeded, a process for preventing current flow in the low-voltage circuit is initiated. A power supply is connected to conductors of the low-voltage circuit between the grid-side connection and the separating contact unit.

25 Claims, 1 Drawing Sheet

(51) Int. Cl.

| | |
|---|---|
| ***H01H 71/04*** | (2006.01) |
| ***H01H 71/12*** | (2006.01) |
| ***H01H 83/22*** | (2006.01) |

(56) References Cited

U.S. PATENT DOCUMENTS

| | | | | |
|---|---|---|---|---|
| 2021/0066013 | A1 | 3/2021 | Kumar et al. | |
| 2022/0337046 | A1 | 10/2022 | Erven | |
| 2023/0198241 | A1 * | 6/2023 | Tannhäuser ............ | H01H 9/548<br>361/101 |
| 2024/0038466 | A1 * | 2/2024 | Tannhäuser ............ | H01H 9/547 |
| 2024/0047152 | A1 * | 2/2024 | Tannhäuser .......... | H01H 71/125 |

* cited by examiner

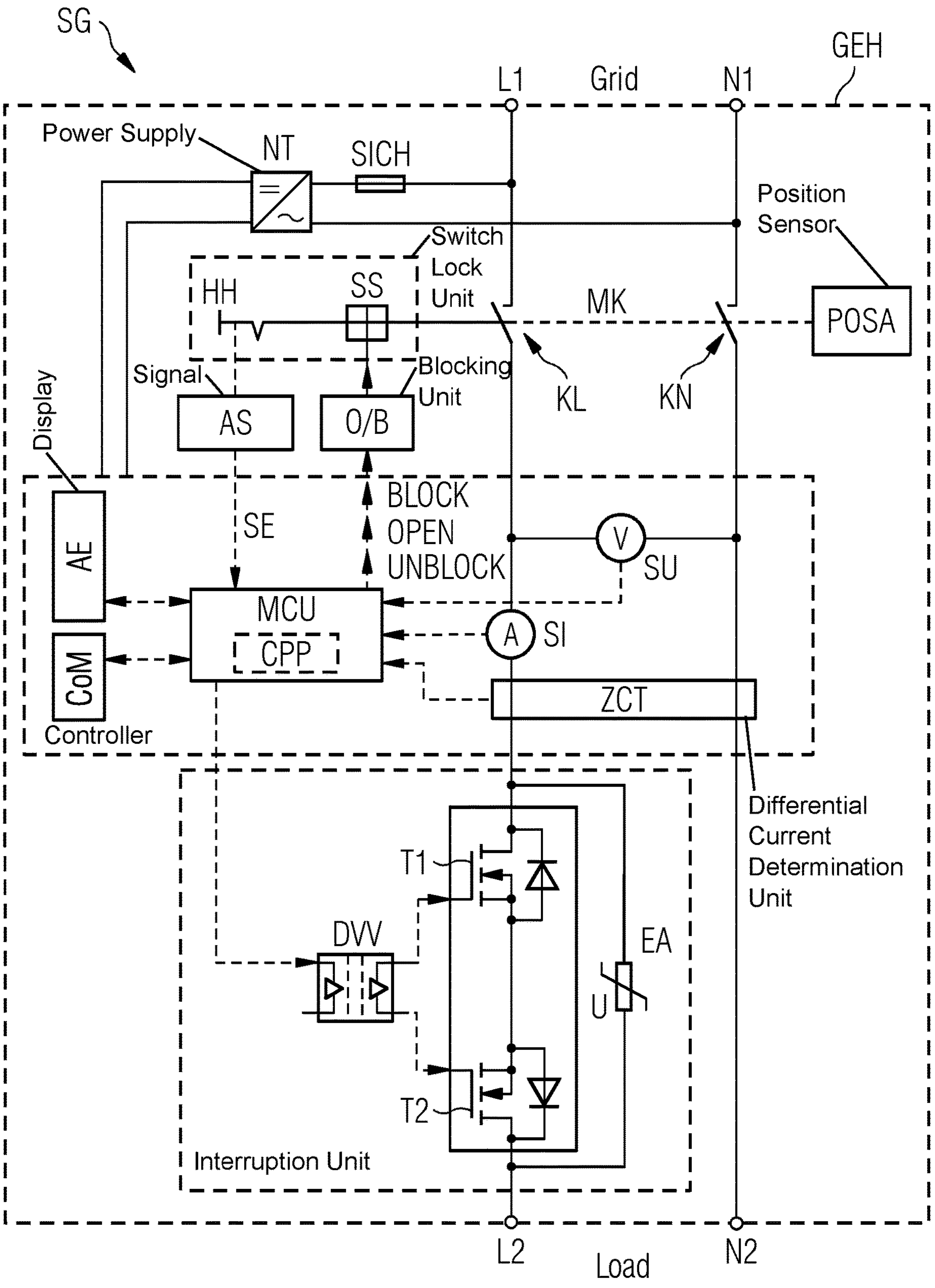
SG
GEH
L1
Grid
N1
Power Supply
NT
SICH
Position
Sensor
Switch
Lock
Unit
HH
SS
MK
POSA
Signal
Blocking
Unit
KL
KN
AS
O/B
Display
BLOCK
OPEN
UNBLOCK
SE
AE
V
SU
MCU
CPP
A
SI
CoM
ZCT
Controller
Differential
Current
Determination
Unit
T1
DVV
EA
U
T2
Interruption Unit
L2
Load
N2

CIRCUIT BREAKER

FIELD AND BACKGROUND OF THE INVENTION

The invention relates to the technical field of a circuit breaker for a low-voltage circuit having an electronic interruption unit.

Low voltage is taken to mean voltages of up to 1000 volts AC voltage or up to 1500 volts DC voltage. Low voltage is taken to mean, in particular, voltages greater than the extra-low voltage, having values of 50 volts AC voltage or 60 volts DC voltage.

Low-voltage circuit or grid or installation is taken to mean circuits having nominal currents, or rated currents, of up to 125 amps, more specifically up to 63 amps. Low-voltage circuit is taken to mean, in particular, circuits having nominal currents, or rated currents, of up to 50 amps, 40 amps, 32 amps, 25 amps, 16 amps or 10 amps. The cited current values are taken to mean, in particular, nominal, rated or/and cut-off currents, i.e. the maximum current normally carried by the circuit or at which the electrical circuit is normally interrupted, for example by a protective device, such as a circuit breaker, miniature circuit breaker or power circuit breaker. The rated currents can be further graduated from 0.5 A through 1 A, 2 A, 3 A, 4 A, 5 A, 6 A, 7 A, 8 A, 9 A, 10 A, etc. up to 16 A.

Miniature circuit breakers are long-known overcurrent protection devices that are used in low-voltage circuits in electrical installation engineering. They protect cables from damage caused by heating due to excessive current and/or short circuits. A miniature circuit breaker can automatically switch off the circuit in the event of overload and/or short circuit. A miniature circuit breaker is a non-automatically resetting fuse element. In contrast to miniature circuit breakers, power circuit breakers are designed for currents greater than 125 A, in some cases even as low as 63 amps. For this reason, miniature circuit breakers are simpler and more delicate in structure. Miniature circuit breakers usually have a mounting facility for mounting them on a so-called top-hat rail (carrier rail, DIN rail, TH35).

Miniature circuit breakers are electromechanical in design. In a housing, they have a mechanical switching contact or working current trip unit to interrupt (trip) the electric current. Usually, a bimetallic protective element or bimetallic element is used for tripping (interruption) in the event of prolonged overcurrent (overcurrent protection) or thermal overload (overload protection). An electromagnetic trip unit with a coil is used for rapid tripping if an overcurrent limit value is exceeded or in the event of a short circuit (short-circuit protection). One or more arc quenching chamber(s) or devices for arc quenching are provided, in addition to connecting elements for conductors of the electrical circuit to be protected.

Circuit breakers with an electronic interruption unit are relatively new developments. These have a semiconductor-based electronic interruption unit. That is to say that the flow of electric current in the low-voltage circuit is carried by semiconductor devices or semiconductor switches, which interrupt the flow of electric current or can be switched to a conductive state. Circuit breakers having an electronic interruption unit also frequently have a mechanical isolating contact system, in particular with isolator switch properties conforming to relevant standards for low-voltage circuits, the contacts of the mechanical isolating contact system being connected in series with the electronic interruption unit, i.e. the current of the low-voltage circuit to be protected is carried both by the mechanical isolating contact system and by the electronic interruption unit.

SUMMARY OF THE INVENTION

The object of the present invention is to improve a circuit breaker of the type mentioned above, in particular to specify a new, improved architecture for such a circuit breaker or to specify a design with increased safety for a circuit breaker or the low-voltage circuit to be protected.

This object is achieved by a circuit breaker having the features of the independent circuit breaker patent claim.

According to the invention, a circuit breaker for protecting an electrical low-voltage circuit, in particular low-voltage AC circuit, is proposed, comprising:

- a housing with grid-side and load-side terminals for conductors of the low-voltage AC circuit, in particular a grid-side phase conductor terminal, a grid-side neutral conductor terminal, a load-side phase conductor terminal, a load-side neutral conductor terminal,
- a mechanical isolating contact unit (MK) connected to the grid-side terminals, which is also connected to an electronic interruption unit (EU) that is also connected to the load-side terminals (L2, N2), so that closed contacts of the isolating contact unit and a low-resistance state of semiconductor-based switching elements of the electronic interruption unit permit a flow of current in the low-voltage circuit, or open contacts of the isolating contact unit permit an electrical isolation preventing a flow of current in the low-voltage circuit or/and a high-resistance state of the switching elements permits a flow of current to be prevented in the low-voltage circuit, i.e. a series circuit formed by a mechanical isolating contact unit and an electronic interruption unit, the mechanical isolating contact unit being arranged on the grid side and the electronic interruption unit being arranged on the load side,

- that the mechanical isolating contact unit has a handle for manually closing and opening the contacts,
- a current sensor unit arranged in a conductor between the isolating contact unit and the interruption unit, to determine the level of the current in the low-voltage circuit,
- a control unit, which is connected to the current sensor unit, the electronic interruption unit and the mechanical isolating contact unit, wherein the circuit breaker is designed such that current limits and/or current-time limits being exceeded results in prevention of a flow of current in the low-voltage circuit being initiated,

- a power supply unit for supplying power to the circuit breaker, in particular the control unit, wherein the power supply unit is connected to conductors of the low-voltage circuit between the grid-side (L1, L2) terminals and the mechanical isolating contact unit (MK), i.e. is arranged on the grid side.

According to the invention, a circuit breaker is proposed, wherein the electronic interruption unit is associated with the load-side terminals (load, energy sink) and the mechanical isolating contact unit is associated with the grid-side terminals (energy source). The power supply unit is electrically connected to the conductors of the low-voltage circuit at the grid-side terminals, further upstream of the mechanical isolating contact unit. That is to say that the power supply unit is normally continually supplied with power (voltage) from the low-voltage circuit, irrespective of the switching position of the contacts of the mechanical isolating contact unit or the high- or low-resistance state of the electronic interruption unit (it is assumed that the low-voltage circuit/ the energy source normally supplies power/voltage). The circuit breaker, in particular the control unit, is therefore able to perform protective or monitoring functions, even if the contacts of the mechanical isolating contact unit are open or the electronic interruption unit is in a high-resistance state to prevent a flow of current.

Advantageous embodiments of the invention are specified in the dependent claims and the exemplary embodiment.

In an advantageous embodiment of the invention, there is provision for a voltage sensor unit connected to the control unit. The voltage sensor unit is provided to determine the level of the voltage between the conductors of the low-voltage circuit, the voltage sensor unit being connected in particular to the conductors between the isolating contact unit and the interruption unit.

This has the particular advantage that the voltage of the low-voltage circuit can be monitored and if necessary the circuit can be isolated in the event of overvoltages or undervoltages. The architecture according to the invention therefore supports increased dependability of the circuit breaker, or in the circuit.

In an advantageous embodiment of the invention, the mechanical isolating contact unit has a position indicator unit. The position indicator unit indicates the position of the contacts, i.e. the contact position (open, closed) is signaled. The position indicator unit is e.g. a mechanical position indicator unit.

This has the particular advantage that information about the contact position (open, closed) is available. Further, in the case of a mechanical position indicator unit, this information can be indicated/is indicated even in the off-circuit state.

In an advantageous embodiment of the invention, the circuit breaker has an indicator unit connected to the control unit.

This has the particular advantage that (status) information relating to the circuit breaker can be indicated, e.g. about switching or/and fault states.

In an advantageous embodiment of the invention, the circuit breaker has a communication unit, connected to the control unit, that facilitates in particular a wireless communication capability.

This has the particular advantage that (status) information, such as switching and fault states, can be transferred to another circuit breaker or monitoring or management system.

In an advantageous embodiment of the invention, there is provision for a differential current determination unit, connected to the control unit, for determining a differential current in the conductors of the low-voltage circuit.

This has the particular advantage that the circuit breaker also has fault current monitoring (differential current monitoring) and therefore has additional functionality.

In an advantageous embodiment of the invention, the circuit breaker is designed such that operation of the mechanical isolating contact unit by way of the handle results in a signal being sent to the control unit before the contacts open, so that the control unit puts the semiconductor-based switching elements of the electronic interruption unit into a high-resistance state.

This has the particular advantage that no-load (zero-power) switching of the mechanical isolating contact unit is supported, in particular arcing or contact erosion is prevented.

In an advantageous embodiment of the invention, the mechanical isolating contact unit is designed such that the contacts can be opened by the control unit, but not closed. Specifically, the contacts can be opened even if the handle is blocked.

This has the particular advantage that increased dependability is achieved because the contact/contacts cannot accidentally be closed by the control unit. As a result of the contacts being opened even if the handle is blocked, a so-called trip-free mechanism is achieved, i.e. the low-voltage circuit is reliably protected even if the handle is blocked.

In an advantageous embodiment of the invention, the circuit breaker, in particular the mechanical isolating contact unit, is designed such that the mechanical isolating contact unit can be put into a blocked state, so that the contacts are prevented from being closed by way of the handle. In particular the control unit is able to put the mechanical isolating contact unit into a blocked state.

In an advantageous embodiment of the invention, the circuit breaker, in particular the mechanical isolating contact unit, is designed such that the mechanical isolating contact unit can be put into an unblocked state, the contacts not being closed, in particular by the control unit. In the unblocked state, the contacts can be closed (again) by way of the handle. In particular the control unit is able to put the mechanical isolating contact unit into an unblocked state.

The unblocked state is in particular adopted again after a blocked state.

In an advantageous embodiment of the invention, the circuit breaker, in particular the mechanical isolating contact unit, is designed such that there is provision for a bistable blocking state, so that the blocked state or the unblocked state of the mechanical isolating contact unit is maintained even in the event of a power failure in the low-voltage circuit.

This has the particular advantage that the contacts are prevented from being closed by way of the handle after e.g. a blocking signal has been applied, in particular by the control unit.

After e.g. an unlock signal has been applied, in particular by the control unit, it is again possible for the contacts to be closed by way of the handle.

That is to say that the mechanical isolating contact unit has a blocking function or a blocking state that can be reset, in particular is bistable.

This has the particular advantage that before checking functions are terminated or after a fault, in particular in the control unit, of the circuit breaker that specifically endangers the functionality of the circuit breaker, a supply of power to the low-voltage circuit to be protected is stopped (as a result of a flow of current being prevented and it not being possible for the contacts to be closed). This increases the safety of the low-voltage circuit since the contacts cannot be closed and therefore an unprotected load is not supplied with power.

In an advantageous embodiment of the invention, the power supply unit has a protective element, in particular a fuse, or/and a switch connected upstream of it.

This has the particular advantage that the power supply unit or the control unit can be disconnected, e.g. for insulation measurements. Further, the power supply unit or the control unit can be protected in order to achieve increased safety for the circuit breaker from other faults.

In an advantageous embodiment of the invention, the power supply unit has an electrical isolation. In particular, there is provision for a transformer. Further, the power supply unit may have a reinforced insulation, such as a double insulation.

This has the particular advantage that the power supply unit has isolator switch properties according to those for open contacts in order to achieve an isolation according to standard between the grid side and the load side. This provides a standard-compliant circuit breaker, the control unit of which, in particular, is normally constantly active (switched on).

In an advantageous embodiment of the invention, the circuit breaker is designed such that when the circuit breaker is first started up in the de-energized (in the example off-circuit) state of the low-voltage circuit the switching elements of the electronic interruption unit are in the high-resistance state and the mechanical isolating contact unit is in a blocked state. When power is supplied (in the example voltage is supplied) in the low-voltage circuit the circuit breaker is supplied with power by the power supply unit. The circuit breaker, in particular the control unit, performs a first checking function of the circuit breaker. A successful outcome of the first checking function results in the mechanical isolating contact unit being unblocked, so that it is possible for the contacts of the mechanical isolating contact unit to be closed by way of the handle. This has the particular advantage that a very safe circuit breaker is provided. Only successfully completed first checking functions, which in particular encompass a self-test, so that the circuit breaker is properly functional and can monitor the circuit, results in the opportunity being provided for the circuit or the load-side lines to be supplied with power, so that a load or the load-side circuit or the load-side lines are reliably protected.

In an advantageous embodiment of the invention, after the first checking function has had a successful outcome and the mechanical isolating contact unit has been unblocked the mechanical isolating contact unit is unblocked even after a power failure.

This has the particular advantage that the circuit breaker can be switched on immediately after a power failure.

In an advantageous embodiment of the invention, after the first checking function has been successful and the mechanical isolating contact unit has been unblocked the switching elements of the electronic interruption unit are in a high-resistance state after the contacts of the mechanical isolating contact unit have been closed by means of the handle.

A second checking function is performed. The switching elements of the electronic interruption unit are put into a low-resistance state after a successful outcome of the second checking function This step concludes the switch-on process, in particular.

This has the particular advantage that a very safe circuit breaker and circuit are provided. Only successfully completed second checking functions, which in particular may encompass a self-test of the electronic interruption unit and specifically load-side or/and grid-side parameters, so that the circuit breaker is properly functional and the selected parameters of the circuit to be protected are checked, in particular that the circuit breaker is suitable for the circuit to be protected and the checked parameters of the circuit are fine, results in the load-side lines being supplied with power, so that a load or the load-side circuit or the load-side lines are reliably protected.

In an advantageous embodiment of the invention, the first (or second) checking function comprises a self-test of the functionality of the circuit breaker. The self-test of the functionality of the circuit breaker involves:

at least one component, in particular multiple components, of a unit, in particular multiple units, of the circuit breaker being checked.

If the at least one component, in particular multiple components, of a unit, in particular multiple units, is/are functional then the first (or second) checking function is terminated with a successful outcome.

This has the particular advantage that only a circuit breaker with functioning units is switched on or monitors the circuit, so that the safety in the low-voltage circuit is ensured.

In an advantageous embodiment of the invention, an unsuccessful outcome of the first checking function results in the contacts of the mechanical isolating contact unit remaining in a blocked state, so that they cannot be closed by way of the handle.

An unsuccessful outcome of the second checking function results, depending on the fault, in the contacts of the mechanical isolating contact unit being able to be opened and put into a blocked state. Alternatively, depending on the fault, the electronic interruption unit may merely remain in a high-resistance state.

This has the particular advantage that a defective circuit breaker that cannot perform its monitoring functions does not permit (accidental) supply of power to a load or to the load-side lines, so that unprotected circuits are avoided, thereby greatly increasing safety.

In an advantageous embodiment of the invention, the checking functions encompass a check on at least one electrical parameter of the load-side or grid-side terminal. In particular, the checking function performs a check on at least one, in particular multiple or all, of the following parameters:

check for a, in particular grid-side, first overvoltage value or/and second overvoltage value or/and third overvoltage value being exceeded, check for a, in particular grid-side, first undervoltage value being underrun, check for a first temperature limit value or/and second temperature limit value or/and third temperature limit value being exceeded, check for parameters of the load-side terminal, in particular for a load-side first or/and second resistance value or load-side first or/and second impedance value being underrun.

Overvoltage or overvoltage value is taken in this context to mean that the applicable operating voltage is exceeded. It does not mean the levels of overvoltage dips, for example in the case of so-called bursts or surges, which may typically be 4 kV or 8 kV (for a 230 volt or 400 volt grid), so-called grid overvoltages (i.e. for example ten times the normative voltage of the low-voltage circuit).

In particular, the first overvoltage value may be a certain percentage higher than the normative voltage value. For example in the case of a normative voltage value of 230 volts, for example 10% higher, 230 V+10%.

In particular, the second overvoltage value may be a certain higher percentage higher than the normative voltage value. For example in the case of a normative voltage value of 230 volts, for example 20% higher, 230 V+20%.

In particular, the third overvoltage value may be a certain even higher percentage higher than the normative voltage value. For example in the case of a normative voltage value of 230 volts, for example 30% higher, 230 V+30%.

This has the particular advantage that e.g. a circuit breaker is not switched on to a grid with differing normative voltage (operating voltage) or for a load with incorrect parameters. As such, e.g. a lack of protection in the event of incorrect connection of e.g. a 230 volt circuit breaker to e.g. the two phases with a voltage of 400 volts can be detected and prevented, and incorrect supply of a load with excessive voltage can be prevented. Similarly, a related potential destruction of the circuit breaker can be avoided. In a similar manner, switching on to a short circuit can be detected and avoided before the full supply voltage is applied. Similarly, if the voltages are too low (a 230 volt device in the 115 volt grid), problems and lack of protection can be avoided. This ensures increased dependability in the low-voltage circuit.

Further, this has the particular advantage that not only is the circuit breaker itself checked, but also the circuit/lines connected to the circuit breaker, i.e. specifically the energy source or the energy sink/load. This is a new functionality for a circuit breaker. As such, faults on the grid side, e.g. as a result of the circuit breaker being connected to the wrong conductors (400 volts instead of 230 volts) or the like, can be detected and avoided. Similarly, possible faults on the load side, e.g. smooth short circuits, can also be detected in good time and switching on to the short circuit can be avoided.

In an advantageous embodiment of the invention, depending on the checked parameters:

- if the first overvoltage value is exceeded, overvoltage information is provided,
- if the second overvoltage value is exceeded, the electronic interruption unit is prevented from changing to a low-resistance state,
- if the third overvoltage value is exceeded, the contacts open,
- if the first undervoltage value is underrun, undervoltage information is provided or/and the electronic interruption unit remains in a high-resistance state, in particular if the voltage level is greater than a second undervoltage value,
- if the first temperature limit value is exceeded, temperature information is provided,
- if the second temperature limit value is exceeded, the electronic interruption unit remains in a high-resistance state,
- if the third temperature limit value is exceeded, the contacts open,
- if the load-side first resistance value or load-side first impedance value is underrun, impedance information is provided,
- if the load-side second resistance value or load-side second impedance value is underrun, the electronic interruption unit remains in a high-resistance state.

This has the particular advantage that hierarchically defined measures—warning—remain in high-resistance state—electrical isolation—are implemented, depending on the circumstance of certain defined parameters being exceeded or underrun. This achieves a hierarchic protection concept and increased dependability in the low-voltage circuit.

In an advantageous embodiment of the invention, the circuit breaker is designed such that operation of the handle to open the contacts results in a signal being sent to the control unit before the contacts open, so that the control unit puts the switching elements of the electronic interruption unit into a high-resistance state. Further, the control unit stores at least one current value or current-time value of the flow of current in the low-voltage circuit in a grid-voltage-independent memory.

This has the particular advantage that no-load (zero-power) switching of the mechanical isolating contact unit is supported, in particular arcing or contact erosion is prevented. Further, the level of the current is detected before e.g. the initiated opening, and can be read out afterwards. This assists in determining the cause of the fault.

In an advantageous embodiment of the invention, the circuit breaker is designed such that a current limit value or/and current-time limit value being exceeded results in the switching elements of the electronic interruption unit being put into a high-resistance state to prevent a flow of current in the low-voltage circuit. Depending on the adjustable configuration of the circuit breaker, further:

- the contacts of the mechanical isolating contact unit are opened or
- the switching elements remain in a high-resistance state and this state is indicated. In particular, the changing of the switching elements to a low-resistance state can be initiated by way of an input, or
- the switching elements change to a low-resistance state after a first period of time or after a check on the load-side terminal, in particular a check on at least one electrical parameter of the load-side terminal, more specifically that a threshold value of the electrical parameter is underrun or exceeded.

This has the particular advantage that a response of the circuit breaker is configurable. In particular, different measures can be configured to prevent a flow of current depending on the application. It is also possible to configure the switching on again of the circuit. This increases the range of application and functionality by way of a circuit breaker.

In an advantageous embodiment of the invention, the circuit breaker is designed such that detection of a fault in a unit of the circuit breaker results in the switching elements of the electronic interruption unit being put into a high-resistance state to prevent a flow of current in the low-voltage circuit,

- further, the contacts of the mechanical isolating contact unit are opened and the mechanical isolating contact unit is put into a blocked state, so that the contacts are prevented from being closed by way of the handle,
- the detection of the fault is communicated by way of the communication unit.

This has the particular advantage that a circuit breaker detects faults itself and automatically establishes a safe state in the low-voltage circuit in the event of a fault being detected, and also prevents it from being switched on again and communicates the fault, the latter being facilitated or supported in particular by way of the power supply unit, which is constantly supplied with power due to the inventive architecture of the circuit breaker.

In an advantageous embodiment of the invention, the circuit breaker is designed such that a power failure in the electrical low-voltage circuit results in the mechanical isolating contact unit remaining in its switching state, so that closed contacts and a subsequent power failure result in the contacts still being closed after the power supply has been restored.

This has the particular advantage that the circuit breaker does not need to be (manually) switched on again after a power failure, thereby ensuring a renewed supply of power.

In an advantageous embodiment of the invention, the control unit has a microcontroller.

This has the particular advantage that the functions according to the invention for increasing the safety of a circuit breaker or of the electrical low-voltage circuit to be protected can be produced by way of an (adaptable) computer program product. Further, changes and improvements to the function can therefore be individually loaded onto a circuit breaker, for example also via the communication unit.

According to the invention, a corresponding method for a circuit breaker for a low-voltage circuit with electronic (semiconductor-based) switching elements having the same and further advantages is claimed.

A method for operating a circuit breaker according to one of the device-based patent claims is claimed.

The method is directed, for example, to the operation of a circuit breaker with a series circuit formed by a mechanical isolating contact unit and an electronic interruption unit, the mechanical isolating contact unit being arranged on the grid side and the electronic interruption unit being arranged on the load side (in the circuit breaker). The mechanical isolating contact unit has a handle for closing and opening contacts. Closed contacts of the isolating contact unit and a low-resistance state of semiconductor-based switching elements of the electronic interruption unit allow a flow of current to be permitted in the low-voltage circuit, OR open contacts of the isolating contact unit permit an electrical isolation preventing a flow of current in the low-voltage circuit or/and a high-resistance state of the switching elements permits a flow of current to be prevented in the low-voltage circuit. The level of the current in the low-voltage circuit is determined (in the circuit breaker) and, if current limit values or/and current-time limit values are exceeded, prevention of a flow of current in the low-voltage circuit is initiated (by means of the mechanical isolating contact unit or/and the electronic interruption unit).

A power supply unit for supplying power to the circuit breaker is provided, which is connected to conductors of the low-voltage circuit in the housing on the grid side, i.e. in the region of the grid-side terminals up to the isolating contact unit (in the circuit breaker).

When the circuit breaker is first started up in the de-energized state of the low-voltage circuit the switching elements of the electronic interruption unit are in the high-resistance state and the mechanical isolating contact unit is in a blocked state. When power is supplied in the low-voltage circuit the circuit breaker is supplied with power by the power supply unit. A first checking function of the circuit breaker is performed. A successful outcome of the first checking function results in the mechanical isolating contact unit being unblocked, so that it is possible for the contacts of the mechanical isolating contact unit to be closed by way of the handle.

Further methods (method embodiments) can be derived from the device-based embodiments, patent claims and the exemplary embodiment.

All embodiments, either in dependent form referring back to the independent patent claims or referring back only to individual features or combinations of features of patent claims, bring about an improvement to a circuit breaker, in particular a new architecture and improved safety of a circuit breaker or of the electrical circuit, and provide a new design for a circuit breaker.

The described properties, features and advantages of this invention and the manner in which they are achieved will become clearer and more plainly comprehensible in conjunction with the description of the exemplary embodiments that follows, said exemplary embodiments being explained in more detail in conjunction with the drawing.

BRIEF DESCRIPTION OF THE FIGURE

FIG. 1 shows a block diagram of a circuit breaker.

DETAILED DESCRIPTION OF THE INVENTION

FIG. 1 shows a representation of a circuit breaker SG for protecting an electrical low-voltage circuit, in particular low-voltage AC circuit, comprising:

- a housing GEH with grid-side L1, N1 and load-side L2, N2 terminals for conductors of the low-voltage AC circuit, the grid-side terminals comprise a grid-side neutral conductor terminal N1 and a grid-side phase conductor terminal L1, the load-side terminals comprise a load-side neutral conductor terminal N2 and a load-side phase conductor terminal L2, an energy source, for example, is connected to the grid-side terminals or the grid-side Grid, (at least) one load, for example, is connected to the load-side terminals or the load-side Load,

- a mechanical isolating contact unit MK connected to the grid-side L1, N1 terminals, which is also connected to an electronic interruption unit EU that is also connected to the load-side terminals L2, N2, i.e. a series circuit formed by a mechanical isolating contact unit MK and an electronic interruption unit EU, wherein the mechanical isolating contact unit MK is associated with the grid-side terminals L1, N1 or the grid Grid and the electronic interruption unit EU is associated with the load-side terminals L2, N2 or the load-side Load,

- so that closed contacts KL, KN of the isolating contact unit MK and a low-resistance state of semiconductor-based switching elements T1, T2 of the electronic interruption unit EU permit a flow of current in the low-voltage circuit, or open contacts KL, KN of the isolating contact unit MK permit an electrical isolation preventing a flow of current in the low-voltage circuit or/and a high-resistance state of the switching elements T1, T2 of the electronic interruption unit EU permits a flow of current to be prevented in the low-voltage circuit,

- the mechanical isolating contact unit MK has a handle for closing and opening the contacts KL, KN that is accessible on the outside of the housing, so that it can be manually operated by a user,
- a current sensor unit SI arranged in a conductor between the isolating contact unit MK and the interruption unit EU, to determine the level of the current in the low-voltage circuit, in the example the current sensor unit SI is arranged in the phase conductor,

- a control unit SE, which is connected to the current sensor unit SI, the electronic interruption unit EU and the mechanical isolating contact unit MK, wherein the circuit breaker SG is designed such that current limits or/and current-time limits being exceeded results in prevention of a flow of current in the low-voltage circuit being initiated, this can be accomplished as a result of the switching elements T1, T2 of the electronic interruption unit EU changing to a high-resistance state or/and as a result of the contacts KL, KN of the mechanical isolating contact unit MK opening,

- a power supply unit NT for supplying power to the circuit breaker SG, in particular the control unit SE, which is connected to conductors of the low-voltage circuit between the grid-side (L1, N1) terminals and the mechanical isolating contact unit (MK). This encompasses a connection that encompasses a direct connection to the grid-side (L1, N1) terminals or the mechanical isolating contact unit (MK). The power supply unit NT is electrically connected upstream of the mechanical isolating contact unit (MK), so that it is supplied with power by the grid-side terminals (provided that the grid-side terminals supply power/voltage) irrespective of the switching state of the contacts of the mechanical isolating contact unit (MK).

The power supply unit is thus normally (provided that the grid side or energy source supplies power) constantly supplied with power. It is therefore possible for protective and monitoring functions to be (more or less) constantly performed in the circuit breaker or by the control unit.

The power supply unit may have a protective element, in particular a fuse SICH (as shown in FIG. 1), or/and a switch connected upstream of it.

The circuit breaker SG in the example further has a voltage sensor unit SU, connected to the control unit SE, for determining the level of the voltage between the conductors of the low-voltage circuit between the isolating contact unit MK and the interruption unit EU.

The circuit breaker SG in the example has a differential current determination unit ZCT, which is connected to the control unit and arranged on the conductors of the low-voltage circuit between the isolating contact unit MK and the interruption unit EU, for determining a differential current in the conductors of the low-voltage circuit.

The circuit breaker SG in the example has an indicator unit AE, connected to the control unit SE, for indicating status information relating to the circuit breaker, in particular the control unit SE.

The circuit breaker SG in the example has a communication unit COM, connected to the control unit SE. Said communication unit can facilitate a wired or wireless communication capability, or both.

The control unit SE has a microcontroller MCU to control the circuit breaker. The microcontroller MCU or the control unit SE may have a computer program product CPP. The computer program product CPP comprises commands that, when the program is executed by the microcontroller MCU, cause the latter to instigate said functions for a circuit breaker.

There may be provision for a computer-readable storage medium that stores the computer program product CPP. Similarly, there may be provision for a data carrier signal that transmits the computer program product CPP. As such, the computer program product CPP or a new computer program product CPP can reach the circuit breaker by way of the communication unit COM.

In the example shown in FIG. 1, the control unit SE comprises the microcontroller MCU along with the computer program product CPP, the indicator unit AE, the communication unit CPP, the current sensor unit SI, the voltage sensor unit SU and the differential current determination unit ZCT. This is only one example; the units may also be separate or grouped differently.

The electronic interruption unit EU in the example shown in FIG. 1 has two semiconductor-based switching elements T1, T2, such as transistors, field effect transistors, IGBTs or the like. The semiconductor-based switching elements T1, T2 can be controlled by a driver unit Drv. The driver unit Drv in the example is in turn controlled by the control unit SE. The electronic interruption unit EU may have an energy absorber EA, to prevent destructive voltage spikes or absorb switching energies.

The electronic interruption unit EU in the example is in single-pole form (for one conductor of the low-voltage circuit). In the example, the electronic interruption unit EU is arranged in the phase conductor.

The mechanical isolating contact unit MK in the example is of two-pole design (in both conductors, of the single-phase AC circuit in the example). With a two-pole design, safe electrical isolation is possible provided that the mechanical isolating contact unit MK is designed with isolator switch properties in accordance with the standard (distances, minimum air gaps, etc.).

The mechanical isolating contact unit MK has a position indicator unit POSA that indicates the (switching) position of the contacts of the mechanical isolating contact unit MK. The position indicator unit is of mechanical design, so that the contact position can be indicated even in the off-circuit state (no power from the grid-side Grid).

The circuit breaker or the mechanical isolating contact unit MK is designed such that operation of the mechanical isolating contact unit MK by way of the handle HH results in an (operating) signal AS being sent to the control unit SE before the contacts KL, KN are opened. The circuit breaker SG or the control unit SE is designed such that the semiconductor-based switching elements T1, T2 of the electronic interruption unit EU are then put into a high-resistance state, thus permitting zero-power switching with the mechanical isolating contact unit MK.

The circuit breaker or the mechanical isolating contact unit MK is designed such that the contacts KL, KN can be opened by the control unit SE, for example by way of an opening signal OPEN, but not closed. Specifically, the contacts can be opened even if the handle is blocked (for example, contrary to customary use, is permanently operated for "On"/contacts closed).

In one embodiment, the circuit breaker or the mechanical isolating contact unit MK is designed such that in particular the control unit SE can put the mechanical isolating contact unit MK into a blocked state, so that the contacts are prevented from being closed by way of the handle.

Further, in particular the control unit SE can put the mechanical isolating contact unit MK into an unblocked state, the contacts not being closed, in particular by the control unit, but the contacts being able to be closed by way of the handle.

Furthermore, the circuit breaker, specifically the mechanical isolating contact unit MK, is designed such that there is provision for a bistable blocking state, so that the blocked state or the unblocked state of the mechanical isolating contact unit MK is maintained even in the event of a power failure in the low-voltage circuit.

There may be provision for other units, such as a switch lock unit SS or a combined opening block unit O/B.

The novel circuit breaker SG according to the invention is designed such that when the circuit breaker is first started up in the de-energized (in the example off-circuit) state of the low-voltage circuit the switching elements of the electronic interruption unit are in the high-resistance state and the mechanical isolating contact unit is in a blocked state. When power is supplied (in the example voltage is supplied) in the low-voltage circuit the circuit breaker is supplied with power by the power supply unit. The circuit breaker, in particular the control unit, performs a first checking function of the circuit breaker. A successful outcome of the first checking function results in the mechanical isolating contact unit being unblocked, so that it is possible for the contacts of the mechanical isolating contact unit to be closed by way of the handle.

After the first checking function has been successful and the mechanical isolating contact unit has been unblocked the switching elements of the electronic interruption unit are (as previously) in a high-resistance state after the contacts of the mechanical isolating contact unit have been closed by means of the handle (which is now possible).

A second checking function is performed. The switching elements of the electronic interruption unit are put into a low-resistance state after a successful outcome of the second checking function.

This step concludes the switch-on process, in particular.

The first and second checking functions comprise, for example, a self-test of the functionality of the circuit breaker. The self-test of the functionality of the circuit breaker involves:

at least one component, in particular multiple components, of a unit, in particular multiple units, of the circuit breaker being checked.

If the at least one component, in particular multiple components, of a unit, in particular multiple units, is/are functional then the first (or second) checking function is terminated with a successful outcome.

The first checking function is, for example, specifically directed to a self-test of the control unit SE, since the latter is supplied with power.

The second checking function may be, for example, specifically directed to a self-test of the electronic interruption unit EU, since this is now supplied with power/voltage is applied.

An unsuccessful outcome of the first checking function results in the contacts of the mechanical isolating contact unit remaining in a blocked state, so that they cannot be closed by way of the handle.

An unsuccessful outcome of the second checking function results, depending on the fault, in the contacts of the mechanical isolating contact unit being able to be opened and put into a blocked state. Alternatively, depending on the fault, the electronic interruption unit may merely remain in a high-resistance state.

The checking functions encompass a check on at least one electrical parameter of the load-side or grid-side terminal. In particular, the checking function performs a check on at least one, in particular multiple or all, of the following parameters:

check for a, in particular grid-side, first overvoltage value or/and second overvoltage value or/and third overvoltage value being exceeded, check for a, in particular grid-side, first undervoltage value being underrun, check for a first temperature limit value or/and second temperature limit value or/and third temperature limit value being exceeded, check for parameters of the load-side terminal, in particular for a load-side first or/and second resistance value or load-side first or/and second impedance value being underrun.

The first checking function can encompass the check for a grid-side first overvoltage value or/and second overvoltage value or/and third overvoltage value being exceeded. Further, a check for a grid-side first undervoltage value being underrun. The second checking function can involve the check for parameters of the load-side terminal, in particular for a load-side first or/and second resistance value or load-side first or/and second impedance value being underrun. This allows switching on to a short circuit to be avoided.

Further, depending on the checked parameters:

if the first overvoltage value is exceeded, overvoltage information is provided, if the second overvoltage value is exceeded, the electronic interruption unit is prevented from changing to a low-resistance state, if the third overvoltage value is exceeded, the contacts open, if the first undervoltage value is underrun, undervoltage information is provided or/and the electronic interruption unit remains in a high-resistance state, in particular if the voltage level is greater than a second undervoltage value, if the first temperature limit value is exceeded, temperature information is provided, if the second temperature limit value is exceeded, the electronic interruption unit remains in a high-resistance state, if the third temperature limit value is exceeded, the contacts open, if the load-side first resistance value or load-side first impedance value is underrun, impedance information is provided, if the load-side second resistance value or load-side second impedance value is underrun, the electronic interruption unit remains in a high-resistance state.

Operation of the handle to open the contacts results in a signal being sent to the control unit before the contacts open, so that the switching elements of the electronic interruption unit are put into a high-resistance state. Further, the control unit stores at least one current value or current-time value of the flow of current in the low-voltage circuit in a grid-voltage-independent memory.

A current limit value or/and current-time limit value being exceeded results in the switching elements of the electronic interruption unit being put into a high-resistance state to prevent a flow of current in the low-voltage circuit. Depending on the adjustable configuration of the circuit breaker, a further possibility is that:

the contacts of the mechanical isolating contact unit are opened or the switching elements remain in a high-resistance state and this state is indicated. In particular, the changing of the switching elements to a low-resistance state can be initiated by way of an input, or the switching elements change to a low-resistance state after a first period of time or after a check on the load-side terminal, in particular a check on at least one electrical parameter of the load-side terminal, more specifically that a threshold value of the electrical parameter is underrun or exceeded.

Detection of a fault in a unit of the circuit breaker results in the switching elements of the electronic interruption unit being put into a high-resistance state to prevent a flow of current in the low-voltage circuit. Further, the contacts of the mechanical isolating contact unit are opened and the mechanical isolating contact unit is put into a blocked state, so that the contacts are prevented from being closed by way of the handle.

The detection of the fault is also communicated by way of the communication unit.

The first/second checking function may be produced by way of the control unit, specifically the microcontroller MCU in combination with the computer program product CPP.

In the absence of functionality, the contacts of the mechanical isolating contact unit can be opened. If the functionality is absent after another (or a certain number of other, e.g. 0 to 3) switch-on process(es), the mechanical isolating contact unit can be put into a blocked state, so that renewed (further) closure of the contacts is prevented.

The circuit breaker may be designed such that a power failure in the electrical low-voltage circuit results in the mechanical isolating contact unit remaining in its switching state, so that closed contacts and a subsequent power failure result in the contacts still being closed after the power supply has been restored.

High resistance is taken to mean a state in which only a current of negligible magnitude now flows. In particular, high resistance means resistance values of greater than 1 kiloohm, preferably greater than 10 kiloohms, 100 kilo-ohms, 1 megohm, 10 megohms, 100 megohms, 1 gigaohm or greater.

Low resistance is taken to mean a state in which the current value specified on the circuit breaker could flow. In particular, low resistance means resistance values that are less than 10 ohms, preferably less than 1 ohm, 100 milliohms, 10 milliohms, 1 milliohm or less.

The invention will be described or summarized again below using different wording.

In electronic circuit breakers according to the invention, mechanical switching contacts in combination with an electronic switch will perform the switching functions.

1.) New Concept:

- Mechanical isolating contacts in both poles
- One pole (in particular phase conductor L) is protected by an electronic interruption unit containing semiconductor-based switching elements, e.g. power semiconductors,
- Relief network (energy absorber) across the switching elements
- Mechanical operation of the handle, which is designed such that a signal is sent to the control unit before the contacts open, and the control unit causes the interruption unit to change to a high-resistance state
- The mechanical isolating contact unit can be opened by the control unit, but cannot be closed
- The mechanical isolating contact unit can only be closed manually by way of the handle
- Measurement technology:
  - Voltage measurement between L and N
  - Current measurement in the protected pole (L)
  - Total current measurement through L and N
- The power supply (=power supply unit) for the control unit taps off the voltage on L and N upstream of the contacts of the mechanical isolating contact unit.

The power supply (=power supply unit) has an electrical isolation (e.g. using a voltage transformer) in order to maintain the isolating function of the mechanical contacts in the overall concept. The electrical isolation should meet standard-compliant requirements, e.g. double insulation.

The power supply (=power supply unit) has a protected connection to L (e.g. fuse)

- The control unit can put the mechanical isolating contact unit into a blocked state. It is then no longer possible to close the contacts by means of the handle. The control unit can put the mechanical isolating contact unit back into an unblocked state.
- The device has a communication interface (preferably wireless)
- The contact position of the (mechanical) contacts is indicated mechanically (e.g. using Green: Off and Red: On).
- The device has an indicator unit that indicates the status of the device, e.g. using light-emitting diodes/LEDs, e.g. as follows:
  - Red: On state
  - Green: Off state, disconnected
  - Yellow: Control state, high resistance 2.) Power-on Behavior:

When powering on, the device is switched on using the handle.

a) The device receives mains voltage
b) The power supply unit begins to supply the device, specifically the control unit, with power
c) The device, specifically the control unit, performs a first checking function/a self-test (specifically of the electronic components)
d) Successful completion results in the mechanical isolating contact unit, e.g. the switch lock, being "switched" from the blocked to the unblocked state (the main current path can now be mechanically switched on manually by way of the handle).

Preferably bistable states: the respective state is maintained even in the off-circuit case; changeover is actively controlled by the control unit e) The handle is used to close the contacts
f) Contacts close
g) The load-side output is still off circuit because the interruption unit is in a high-resistance state/in the disabled state
h) Second checking function, e.g. load is checked for e.g. short circuit
i) A successful test results in the interruption unit changing to a low-resistance state (without further (manual) operation))
j) Load side receives power, load is supplied with power.

3.) Power-Off Behavior:

When powering off, the device is switched off using the handle (manual operation).

a) Handle is set to Off (to open contacts)
b) The operating action is sent to the control unit before the contacts open
c) The interruption unit changes to a high-resistance state immediately (or intelligently at the zero crossing)
d) The contacts open
e) The power supply for the electronics is maintained even in the isolated state (disconnected).
i. In some cases the control unit is supplied with an appropriate safety extra-low voltage by the power supply unit, e.g. 3 V or 5 V
ii. The power supply includes a safe electrical isolation from the mains voltage (e.g. by way of a double or extra-reinforced insulation in the voltage transformer)
iii. The power supply could be isolated from the grid using a small switch.

4.) Behavior in the Event of a Fault in the Load: Short Circuit or Overload:

If a device experiences e.g. a short circuit in the load, the device reacts as follows.

a) A current limit value being exceeded is detected by the relevant units
b) The interruption unit is switched to the high-resistance state, so that the load is no longer supplied with power/voltage c) The device can then decide, depending on the configuration (based on fault type and/or fault current), which of the e.g. following (two) states is adopted:

1) The device automatically opens the mechanical contacts and the load is completely disconnected 2) The device remains in the high-resistance state (the contacts of the isolating contact unit remain closed—the device does not disconnect). From this state, an automatic power-on is possible again.

5.) Behavior in the Event of (Internal) Device Fault:

If a fault occurs in the circuit breaker, in particular the control unit, the device changes to a safe state from which the device cannot be switched on again. The precondition is the detection of the defect by the circuit breaker.

a) The fault is detected in the circuit breaker b) The device switches the interruption unit to a high-resistance state c) The device opens the contacts of the isolating contact unit and in so doing blocks the isolating contact unit (e.g. the switch lock) so that the contacts can no longer be closed by way of the handle d) The fault is reported using the communication unit.

6.) Behavior in the Event of Grid Failure/Power Failure:

If a grid failure occurs, the circuit breaker is no longer supplied with power. The contacts remain closed/in the previous position. This means that the device can change to the previous switching state without manual operation when the grid voltage returns.

Although the invention has been illustrated and described in greater detail by way of the exemplary embodiment, the invention is not restricted by the examples disclosed and other variations can be derived therefrom by a person skilled in the art without departing from the scope of protection of the invention.

The invention claimed is:

1. A circuit breaker for protecting an electrical low-voltage AC circuit, the circuit breaker comprising:

a housing with grid-side and load-side terminals for conductors of the electrical low-voltage AC circuit;

an electronic interruption unit connected to said load-side terminals and having semiconductor-based switching elements;

a mechanical isolating contact unit having contacts and connected to said grid-side terminals and also connected to said electronic interruption unit, so that closed said contacts of said mechanical isolating contact unit and a low-impedance state of said semiconductor-based switching elements of said electronic interruption unit permit a flow of current in the electrical low-voltage AC circuit, or open said contacts of said mechanical isolating contact unit permit an electrical isolation preventing the flow of the current in the electrical low-voltage AC circuit and/or a high-impedance state of said semiconductor-based switching elements preventing the flow of the current in the electrical low-voltage AC circuit, said mechanical isolating contact unit having a handle for closing and opening said contacts;

a current sensor disposed in a conductor downstream of said mechanical isolating contact unit, to determine a level of a current in the electrical low-voltage AC circuit;

a controller connected to said current sensor, said electronic interruption unit and said mechanical isolating contact unit, wherein the circuit breaker is configured such that current limits and/or current-time limits being exceeded results in prevention of the flow of the current in the electrical low-voltage AC circuit being initiated; and a power supply for supplying power to the circuit breaker, which is connected to the conductors of the electrical low-voltage AC circuit between said grid-side terminals and said mechanical isolating contact unit.

2. The circuit breaker according to claim 1, further comprising a voltage sensor, connected to said controller, for determining a level of a voltage between the conductors of the electrical low-voltage AC circuit between said mechanical isolating contact unit and said electronic interruption unit.

3. The circuit breaker according to claim 1, wherein said mechanical isolating contact unit has a position sensor for a position of said contacts.

4. The circuit breaker according to claim 1, further comprising a display connected to said controller.

5. The circuit breaker according to claim 1, further comprising a communication unit, connected to said controller, that facilitates in a wireless communication capability.

6. The circuit breaker according to claim 1, further comprising a differential current determination unit, connected to said controller, for determining a differential current in the conductors of the electrical low-voltage AC circuit.

7. The circuit breaker according to claim 1, wherein the circuit breaker is configured such that operation of said mechanical isolating contact unit by way of said handle results in a signal being sent to said controller before said contacts open, so that said controller puts said semiconductor-based switching elements of said electronic interruption unit into the high-impedance state.

8. The circuit breaker according to claim 1, wherein said mechanical isolating contact unit is configured such that said contacts are opened by said controller but not closed.

9. The circuit breaker according to claim 1, wherein the circuit breaker is configured such that said controller can put said mechanical isolating contact unit into a blocked state, so that said contacts are prevented from being closed by way of said handle.

10. The circuit breaker according to claim 9, wherein said controller puts said mechanical isolating contact unit into an unblocked state, said contacts not being closed, but said contacts being able to be closed by way of said handle.

11. The circuit breaker according to claim 9, wherein said mechanical isolating contact unit is configured such that there is provision for a bistable blocking state, so that the blocked state or an unblocked state of said mechanical isolating contact unit is maintained even in an event of a power failure in the electrical low-voltage AC circuit.

12. The circuit breaker according to claim 1, further comprising a protective element connected upstream of said power supply.

13. The circuit breaker according to claim 1, wherein said power supply has electrical isolation.

14. The circuit breaker according to claim 1, wherein the circuit breaker is configured such that when the circuit breaker is first started up in a de-energized state of the electrical low-voltage AC circuit said semiconductor-based switching elements of said electronic interruption unit are in the high-impedance state and said mechanical isolating contact unit is in a blocked state, and:

when power is supplied in the electrical low-voltage AC circuit the circuit breaker is supplied with power by said power supply; and said controller performs a first checking function of the circuit breaker, a successful outcome of the first checking function resulting in said mechanical isolating contact unit being unblocked, so that it is possible for said contacts of said mechanical isolating contact unit to be closed by way of said handle.

15. The circuit breaker according to claim 14, wherein after the first checking function has had a successful outcome and said mechanical isolating contact unit has been unblocked, said mechanical isolating contact unit is unblocked even after a power failure.

16. The circuit breaker according to claim 14, wherein after the first checking function has been successful and said mechanical isolating contact unit has been unblocked, said semiconductor-based switching elements of said electronic interruption unit are in the high-impedance state after said contacts of said mechanical isolating contact unit have been closed by means of said handle, a second checking function is performed, in that said semiconductor-based switching elements of said electronic interruption unit are put into the low-impedance state after a successful outcome of the second checking function.

17. The circuit breaker according to claim 14, wherein the first checking function includes a self-test of the functionality of the circuit breaker, which involves at least one component of a unit of the circuit breaker being checked, and if the at least one component of the unit is functional then the first checking function is terminated with a successful outcome.

18. The circuit breaker according to claim 14, wherein the first checking function encompasses a check on at least one electrical parameter of a grid-side terminal of said terminals.

19. The circuit breaker according to claim 16, wherein the second checking function includes a self-test of a functionality of the circuit breaker in accordance with the first checking function and/or encompasses a check on at least one electrical parameter of a load-side terminal of said terminals.

20. The circuit breaker according to claim 1, wherein the circuit breaker is configured such that initiated opening of said contacts by means of said handle results in a signal being sent to said controller before said contacts open, so that said semiconductor-based switching elements of said electronic interruption unit are put into the high-impedance state.

21. The circuit breaker according to claim 1, wherein the circuit breaker is configured such that a current limit value or/and current-time limit value being exceeded results in said semiconductor-based switching elements of said electronic interruption unit being put into the high-resistance impedance to prevent the flow of the current in the electrical low-voltage AC circuit, in that, depending on an adjustable configuration of the circuit breaker, further:

said contacts of said mechanical isolating contact unit are opened; or said semiconductor-based switching elements remain in the high-impedance state and the high impedance state is indicated; or said semiconductor-based switching elements change to the low-impedance state after a first period of time or after a check on said load-side terminal.

22. The circuit breaker according to claim 5, wherein the circuit breaker is configured such that detection of a fault in a unit of the circuit breaker results in said semiconductor-based switching elements of said electronic interruption unit being put into the high-impedance state to prevent the flow of the current in the electrical low-voltage AC circuit, and:

said contacts of said mechanical isolating contact unit are opened and said mechanical isolating contact unit is put into a blocked state, so that said contacts are prevented from being closed by way of said handle; and detection of a fault is communicated by way of said communication unit.

23. The circuit breaker according to claim 1, wherein the circuit breaker is configured such that a power failure in the electrical low-voltage AC circuit results in said mechanical isolating contact unit remaining in its switching state, so that closed said contacts and a subsequent power failure result in said contacts still being closed after the power supply has been restored.

24. The circuit breaker according to claim 1, wherein said controller has a microcontroller.

25. An operating method, which comprises the steps of:

providing the circuit breaker according to claim 1;

operating the circuit breaker.

* * * * *